May 20, 1958  W. N. LINDSAY  2,835,483
APPARATUS FOR HEATING FLUIDS
Filed Feb. 3, 1954
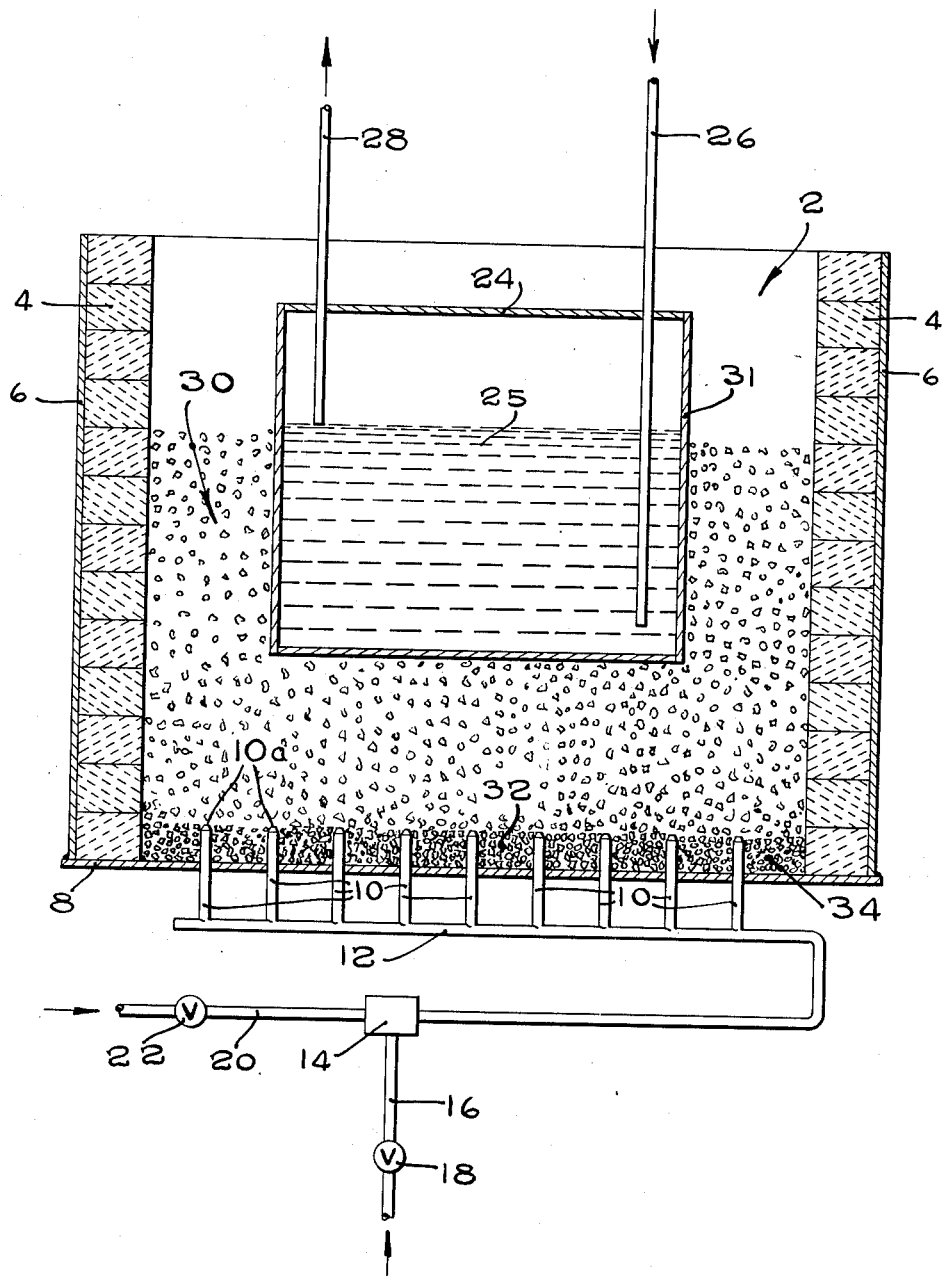
INVENTOR
WESLEY N. LINDSAY
BY Hans G. Hoffmeister
ATTORNEY

United States Patent Office 2,835,483
Patented May 20, 1958

2,835,483

APPARATUS FOR HEATING FLUIDS

Wesley N. Lindsay, San Jose, Calif., assignor to Food Machinery and Chemical Corporation, San Jose, Calif., a corporation of Delaware Application February 3, 1954, Serial No. 407,967

1 Claim. (Cl. 263—41)

The present invention relates to methods of, and apparatus for, heating fluids.

When gases, liquids or fluidized granular solids are to be heated to high temperatures, they are usually contained in, or are passed through, vessels in the form of tanks, tubular coils and the like, which are exposed to the source of heat. For this purpose it is common to place such vessels in a furnace wherein a fuel is burned with air to create a zone of intense heat. Heat is transmitted to the vessel by convection and also by radiation from the combustion gases and from the hot refractory walls of the furnace which in turn are heated by the flame. To obtain a high rate of heat transfer, the combustion gases and the refractory furnace walls may be at a temperature that is higher than the melting point of the vessel, and when the contents of the vessel are to be heated to temperatures approaching the endurance limit of the particular material from which the vessel is made, and the heat generated exteriorly of and applied to the outside of the vessel causes the temperature of the vessel to approach said endurance limit, there arises the danger that, due to non-uniformities in the heating medium applied to the vessel and/or due to non-uniformities in the rate of heat removal from the walls of the vessel by the fluid within the vessel, the temperature of the vessel may locally rise above the endurance limit causing excessive oxidation and even melting of certain areas of the vessel. Thus, if a deposit develops on the wall of the vessel, the rate of heat removal at that particular area of the vessel wall may be seriously decreased, and as a result thereof the temperature of the vessel wall underneath said deposit might rise above the endurance limit of the metal or metal alloy from which the vessel is made, and cause the wall to perforate. This may endanger attending personnel and will always necessitate costly repairs.

It is an object of the present invention to provide a method of, and apparatus for, applying heat uniformly to an article to be heated.

Another object is to provide a method of, and apparatus for applying heat to an article to be heated in such a manner that the temperatures imparted to the article may readily be controlled.

Another object is to provide a method of applying heat to the wall of a metal vessel containing a fluid to be heated, in a manner that guarantees a high rate of heat transfer from the source of heat to the fluid within the vessel.

Another object is to provide a method of applying heat to a metal vessel in such a manner as to minimize local temperature increases of the wall of the vessel, should deposits develop thereon.

Another object is to provide a method of, and apparatus for, applying with safety such temperatures to a vessel as will closely approach the endurance limit of the material from which it may be made.

In accordance with the invention I apply heat to the article to be heated through the medium of heated fluidized masses of granular refractory material. For this purpose I place the articles to be heated, such as for instance a vessel containing a fluid, into a chamber which contains quantities of a granular refractory material and which is to be heated by the combustion of a fluid fuel, and I inject the fuel and its oxidizing agent with such velocity into said chamber as to maintain said granular material in a state of dense phase fluidization in contact with the vessel to be heated. The temperature of the fluidized bed of granular solids thus established may be varied by varying the quantity of fuel fed into the chamber and owing to the large heat capacity of the fluidized mass of granular refractory material, the temperature of the fluidized heating bed in contact with the vessel will vary slowly as the amount of fuel fed into the furnace is varied. Hence, the temperature of the fluidized mass, and consequently the heat applied to the vessel, may be controlled with ease. By appropriately choosing the particle size and the density of the fluidized refractory material, it is possible to secure a predetermined rate of heat transfer from the heated fluidized particles to, and through, the walls of the vessel. The rapid motion and the large total surface area of the refractory particles cooperate to transmit the heat of the combustion process uniformly to the walls of the vessel.

The accompanying drawing illustrates an exemplary apparatus for carrying out the method of the invention in practice. The reference numeral 2 designates a suitable combustion chamber formed by side walls 4 of refractory bricks that are surrounded by a suitable metal jacket 6. The floor of chamber 2 is formed by a flat metal plate 8 through which protrudes a plurality of injection nozzles 10 of relatively small diameter that rise from a common manifold 12 which extends below the floor plate 10, said nozzles having restricted tapered orifices 10a. Said manifold is supplied with a suitable mixture of a fluid fuel, such as natural gas and an oxidizing agent, such as air, from a mixer represented by the block 14. The fuel may be supplied to the mixer through a conduit 16 controlled by a valve 18, and the oxidizing agent may be supplied to the mixer through a conduit 20 controlled by a valve 22.

Suitably mounted within the chamber 2 a distance above the nozzles 10 is a closed tank 24. Said tank may serve to contain a liquid 25 which is delivered into the tank through a conduit 26 and which leaves said tank through another conduit 28. In the exemplary embodiment of the invention illustrated in the accompanying drawing, said tank is shown to be of rectangular cross section. It will be understood that it may have any other suitable form, and while it is shown as containing a liquid, it may also serve to heat a stream of gas or a mass of fluidized solid particles that circulates through the tank from conduit 26 to conduit 28. Alternatively, a bank of pipes or tubular coils may take the place of the tank 24.

Upon entering the chamber 2 through the restricted orifices 10a of nozzles 10, the fuel is immediately ignited, and as it burns it maintains a mass of refractory particles 30 in fluidized suspension. The refractory particles may, for instance, be magnesia granules of an average diameter of $\frac{1}{16}$ inch. The heat generated by the combustion of the fuel is rapidly imparted to the refractory granules, and the granules, due to their violent motion, distribute the heat uniformly through the total fluidized bed and transfer part of it to the wall 31 of the closed tank 24.

As shown in the accompanying drawing, I prefer to arrange the injection nozzles 10 in such a manner that they project a limited distance above the floor plate 8 of chamber 2. By this arrangement, it is possible to dispense with a refractory brick lining for the floor, because a layer of refractory particles reaching to the tips of the nozzles 10 will remain upon the floor plate 8 in non-fluidized condition during operation of the combustion process, as indicated at 32, effectively protecting not only the metal plate 8 but also the nozzles themselves from the radiant heat of the combustion zone. This arrangement eliminates in a simple manner the problems inherent in leading metal conduits through walls of refractory material which problems are largely caused by the unequal heat coefficient of metals and refractory materials. In fact, the described layer of loose non-fluidized particles of refractory material protects the metallic floor plate 8 of chamber 2 more effectively from direct exposure to the heat of the combustion process than a lining of refractory brick because refractory bricks crack invariably when exposed to temperature variations, and may become displaced to the extent of covering the end of one or more of the nozzles, thereby directing the burning gases downwardly against plate 8. The loose refractory granules of layer 34, however, are free to shift as they expand or shrink with variations in the heat developed in chamber 2, and therefore will neither bend, displace or block the nozzles 10.

I found that the described fluidized heating bed of refractory granules has no appreciable erosion effect upon the walls of the vessel to be heated.

While I have shown one particular apparatus for carrying out the process of the invention in practice, many other suitable arrangements will readily occur to those skilled in the art. Thus, the vessel which contains the substance to be heated may be constructed to form the side walls of the combustion chamber, and the fuel need not be introduced into the combustion chamber pre-mixed with combustion air but both the fuel and the combustion air may be introduced into the chamber through separate conduits and may be allowed to mix in the proper proportion within said chamber.

Having thus described my invention what I claim is:

An apparatus for uniformly heating fluid, comprising a combustion chamber having side walls and a floor comprising a metal plate, a plurality of injection nozzles of relatively small diameter and having restricted tapered orifices for admitting fuel and an oxidizing medium into said chamber, said nozzles extending vertically through said metal plate and projecting a predetermined distance thereabove, a closed vessel for holding the fluid to be heated disposed within said chamber in vertically spaced relation to said nozzles, said vessel having conduit means for admitting thereto fluid to be heated and for discharging the heated fluid therefrom, and a bed of loose refractory particles disposed within said chamber surrounding the lower portion of said vessel, said refractory bed including a lower non-fluidized layer on said floor plate extending around the upwardly projecting ends of said nozzles, the injection of fuel and oxidizing agent through said nozzles serving to establish a fluidized mass above said nozzles and partially surrounding said vessel.

References Cited in the file of this patent

UNITED STATES PATENTS

| 2,610,842 | Schoenmakers et al. | Sept. 10, 1952 |
| 2,715,565 | McKay | Aug. 16, 1955 |

FOREIGN PATENTS

| 949,029 | France | Aug. 18, 1949 |